United States Patent [19]

Mehnert

[11] 4,073,847
[45] Feb. 14, 1978

[54] MULTI-STAGE BLOW HOLDING METHOD

[76] Inventor: Gottfried Mehnert, Messelstrasse 25, D-1000, Berlin 33, Germany

[21] Appl. No.: 615,796

[22] Filed: Sept. 22, 1975

Related U.S. Application Data

[63] Continuation of Ser. No. 415,802, Nov. 14, 1973, abandoned.

[30] Foreign Application Priority Data

Nov. 18, 1972 Germany ............................ 2256684

[51] Int. Cl.$^2$ ............................................ B29C 17/07
[52] U.S. Cl. ........................................ 264/89; 264/98; 264/296; 425/530; 425/534; 425/538
[58] Field of Search ..................... 264/89, 90, 92, 94, 264/96–99, 296; 425/326 B, 387 B, DIG. 206, DIG. 211, DIG. 213, DIG. 215, DIG. 216, 530, 532, 534, 538, 540

[56] References Cited

U.S. PATENT DOCUMENTS

| 3,325,862 | 6/1967 | Mehnert | 264/98 X |
| 3,632,261 | 1/1972 | Gasior et al. | 425/387 B X |
| 3,754,851 | 8/1973 | Reilly et al. | 264/98 X |
| 3,767,747 | 10/1973 | Uhlig | 264/98 X |

Primary Examiner—Jan H. Silbaugh
Attorney, Agent, or Firm—Michael J. Striker

[57] ABSTRACT

A multi-stage blow molding method according to which parisons are extruded one after the other at an extruding station and are accepted by a first mold which transfers them from the extruding station to a first blowing station where the parisons are converted into hollow blanks. Such blanks are removed from the first blowing station by two or more additional molds which thereupon convert the blanks into final shaped articles at discrete second blowing stations. The number of blanks which are treated by each additional mold is half or less than half the total number of parisons which are being converted into blanks at the first blowing station. This insures that the time for cooling and hardening of shaped articles at the respective second blowing stations can greatly exceed the time which is allotted for partial hardening of blanks at the first blowing station. Instead of being removed from the first blowing station by the additional molds, the blanks can be transferred to the second blowing stations by suitable gripping devices or by blowing mandrels.

5 Claims, 4 Drawing Figures

MULTI-STAGE BLOW HOLDING METHOD

This is a continuation, of application Ser. No. 415,802, filed Nov. 14, 1973, now abandoned.

BACKGROUND OF THE INVENTION

The present invention relates to the making of hollow shaped articles from synthetic thermoplastic material, and more particularly to improvements in the making of bottles, vials, cans analogous containers or other types of hollow articles by the blow molding method. Still more particularly, the invention relates to improvement in a multi-stage blow molding method of making hollow shaped articles from synthetic thermoplastic material.

Blow molding involves the conversion of tubular or strip-shaped parisons into hollow shaped articles by confining a parison in the cavity of an open-and-shut mold, introducing into the parison a compressed gaseous blowing medium (or withdrawing air from the cavity around the parison) to thus cause the parison to expand and to conform its exterior to the outline of the surface surrounding the mold cavity, and allowing the expanded body to cool sufficiently to retain its shape and to reduce the likelihood of adherence to parts of the machine and/or to other shaped bodies upon removal from the cavity.

It is further known to resort to a multi-stage blowing method. This involves the conversion of a parison into a hollow blank which may but need not closely resemble the ultimate product, and to thereupon convert the blank into a shaped article. The conversion of parisons into blanks takes place in a first step and the conversion of blanks into shaped articles takes place in a further step. The parisons are preferably obtained by extruding a continuous tube or web through the nozzle of a suitable extruding machine and severing the tube or web at regular intervals so that the tube or web yields a succession of tubular or strip-shaped parisons.

The conversion of parisons into blanks and/or the conversion of parisons or blanks into shaped articles can be effected by resorting to a blowing mandrel or a blowing needle. An advantage of the mandrel is that it can be used as a means for centering a hollow article or blank in the respective mold cavity as well as a means for shaping and calibrating the neck of a bottle or an analogous container. The needle is used if the parison or blank is sealed at both ends. During travel from the blowing station to the station where the parisons are converted into blanks, from the blowing station to the station where the parisons are immediately converted into shaped articles, or from the station for the making of blanks to the station for the making of shaped articles, the parisons or blanks can move along straight, arcuate, horizontal, vertical or otherwise configured and/or oriented paths.

The length of a complete cycle of making shaped articles directly from parisons involves a movement of the mold from the extruding station to the blowing station, expanding the parison at the blowing station, cooling and thus obtained shaped article, and return movement of the mold to the extruding station. This length is determined mainly by three factors, i.e., the duration of the interval which is required for the extrusion of a parison, the duration of the interval which is required to expand the parison at the blowing station, and particularly the duration of the interval for cooling of the shaped article before the mold is allowed to open in order to eject the finished product from the cavity. The interval of extrusion in a modern extruding machine for tubular or otherwise shaped parisons is extremely short so that it does not exert an appreciable influence on the overall length of a complete cycle. The interval of expansion of a parison in the mold cavity is also very short; in fact, one can speak of practically instantaneous conversion of a parison into a shaped article. The interval of transfer of parisons from the extruding to the blowing station is also very short, especially since the parisons are normally obtained by severing a continuously extruded tube or strip at regular intervals so that the mold whose cavity has received a freshly severed parison must be removed from the extruding station as rapidly as possible in order not to interfere with the extrusion of the next-following parison.

The longest interval is always the one which is required to allow for satisfactory cooling and rigidifying of the shaped article before the article can be removed from the mold cavity. The duration of this interval depends, of course, on the size of the shaped article, on the thickness of its walls, on the nature of thermoplastic material, and on the intensity of the cooling action. The cooling of those portions which contain relatively large quantities of material takes much longer than the cooling of relatively thin walls or the like. For example, the cooling of the neck portion of a plastic bottle takes much longer than the cooling of the main body portion. Satisfactory cooling and hardening of the shaped article is desirable for many reasons which are in part obvious, i.e., to reduce the likelihood of deformation during transport from the blowing station and/or during further processing, to avoid contamination of the machine with plasticized material of the articles, and to prevent the articles from adhering to each other, to the conveyors and/or to stationary parts of the machine.

It was already proposed to produce hollow blow molded articles in several stages, not only when the articles are expanded exclusively by resorting to a gaseous fluid but also when the articles are produced in accordance with the so-called biaxial stretching procedure as disclosed, for example, in U.S. Pat. No. 2,919,462 to Friden. In each instance, the parison is converted first into a hollow blank which may but need not resemble the final product, and the blank is thereupon converted in a mold into a shaped article or final product. German Auslegeschrift No. 1,084,908 discloses an apparatus wherein the blowing mandrel extends into a nest and is surrounded therein by a freshly extruded parison which is closed at one end and is immediately caused to assume the shape of a hollow blank. The mandrel is then transferred to a blowing station while the blank is suspended thereon, and the blank is finally expanded in the cavity of a blow mold.

The biaxial stretching can be carried out in a similar apparatus. The main difference is that the latter apparatus employs a discrete first mold for the shaping of blanks and a discrete second mold for the shaping of final products. In each instance, the longest interval in the making of a blank or final product is the one which involves cooling and hardening of the body. Almost invariably, the cooling of the final product takes up more time than the cooling of blanks. This necessitates certain adjustments which often affect the quality of the blanks, mainly because the blanks are cooled longer than desirable and are not in an optimum condition for conversion into shaped articles. This occurs even if the mold for the shaping of final products is forcibly cooled with water or another fluid. It will be readily understood that pronounced cooling of blanks is undesirable because their material should remain sufficiently deformable to allow for conversion into shaped articles of predetermined size and shape.

SUMMARY OF THE INVENTION

An object of the invention is to provide an improved multi-stage method of producing hollow shaped articles by blow molding.

Another object of the invention is to provide a method which can be resorted to for mass-production of blow molded articles in plural stages.

A further object of the invention is to provide a method which insures that the blanks which are obtained from parisons are in an optimum condition for conversion into hollow shaped articles even if the time which is required for the cooling of blanks is only a small fraction of the time which is needed for the cooling of final products.

An additional object of the invention is to provide a multi-stage blow molding method which can be resorted to in the making of relatively small as well as large and bulky shaped articles and which can be carried out by resorting to relatively simple and compact apparatus.

The invention is embodied in a method of converting plasticized parisons consisting of a synthetic thermoplastic material into hollow shaped articles. The method comprises the steps of extruding a succession of parisons; converting successsive parisons into hollow blanks at a first station (this converting step includes pneumatically expanding the parisons), transferring successively produced blanks from the first station to successive ones of a plurality of second stations, and converting the blanks at the second stations into hollow shaped articles by pneumatically expanding the blanks.

In accordance with a feature of the invention, the length of the intervals for conversion of parisons into blanks is approximately equal to $m/n$ wherein $n$ is the number of second stations and $m$ is the length of the intervals for conversion of blanks into shaped articles. Thus, if the number of second stations is two, the time which can be spent for the conversion of a blank into a shaped article is twice as long as the time which is needed to convert a parison into a blank.

The step of transferring blanks from the first station to the second stations may comprise confining the blanks in the cavities of molds at the first station and transferring the molds, with the blanks confined therein, to the respective second stations. Alternatively, the step of transferring blanks from the first station to the second stations may comprise gripping the blanks at the first station (e.g., by causing them to adhere to a blowing mandrel or by clamping them by tongs or the like) so that the major part of each blank remains exposed, and moving the thus gripped blanks to the respective second stations where the blanks enter suitable molds for conversion into shaped articles.

All of the second stations may but need not be located at the same distance from the first station, and the step of transferring blanks from the first station to the second stations may include moving the blanks along straight and/or arcuate paths.

The parisons may be extruded at a third station, and the method may include the additional step of transferring successive parisons from the third station to the first station, for example, in the mold which is used for the making of blanks. The path along which the parisons are moved from the third station to the first station is preferably a straight path. Each parison may constitute a tube, and the configuration of blanks may resemble that of shaped articles. The parisons and the blanks are preferably maintained in upright positions during transport from the third station to the first station and from the first station to the second stations.

The novel features which are considered as characteristic of the invention are set forth in particular in the appended claims. The improved method itself, however, together with additional features and advantages thereof, will be best understood upon perusal of the following detailed description of certain apparatus which are shown in the accompanying drawing and are designed to carry out the method.

DESCRIPTION OF THE PREFERRED EMBODIMENTS

Figure 1:
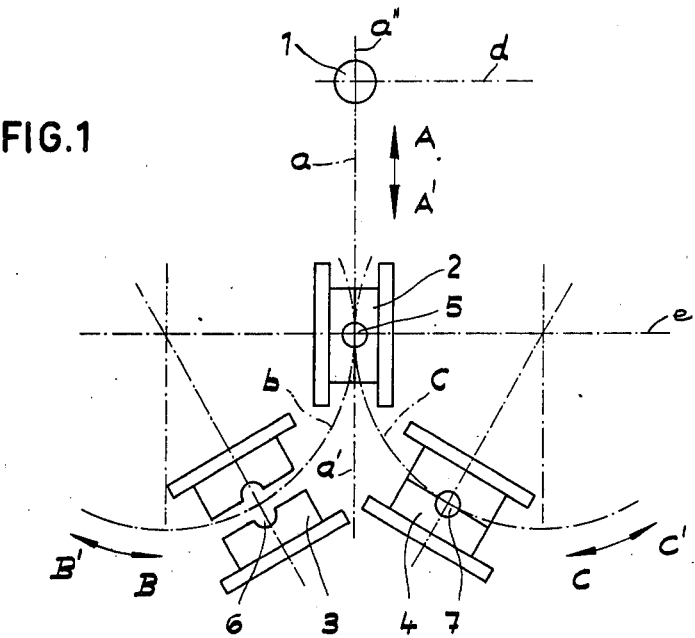
FIG. 1 is a schematic plan view of an apparatus which can be used for the practice of one embodiment of the method.

Referring first to FIG. 1, there is shown an apparatus which can be used for the practice of a multistage blow molding method. The apparatus includes a first open-and-shut mold or preform 2 which is movable to and from a first blowing station 5, two additional open-and-shut molds 3, 4 which are respectively movable to and from second blowing stations 6, 7, and an extruding machine including an extrusion nozzle 1 which is located at a third or extruding station. The nozzle 1 is assumed to form a continuous tube consisting of plasticized synthetic thermoplastic material, and such tube is severed at regular intervals in a manner which is well known from the art of blow molding to yield a succession of tubular parisons.

The mold 2 is movable back and forth along a straight path $a$ between the extruding station where it opens up so as to accept a freshly formed parison, and the blowing station 5 where the parison which is confined therein is converted into a hollow blank with a compressed gaseous blowing medium which is supplied by a blowing mandrel of any known design. The directions in which the mold 2 is movable between the extruding station (nozzle 1) and the blowing station 5 are indicated by arrows A and A'.

The mold 3 is movable between the blowing stations 5 and 6 along an arcuate path $b$. This mold accepts a hollow blank at the station 5 and thereupon closes during transfer back to the station 6 where the blank is converted into a hollow shaped article before the mold 3 opens in order to allow for evacuation or ejection of the final product. The directions in which the mold 3 is movable to and from the blowing station 5 are indicated by arrows B and B'.

The mold 4 is movable along an arcuate path c in directions indicated by arrows C and C' for the same purpose as the mold 3, except that the movements of the mold 4 to the blowing station 2 alternate with such movements of the mold 3. The distance between the stations 5 and 6 is the same as that between the stations 5, 7.

The operation is as follows:

It is assumed that the mold 2 dwells at the first blowing station 5 and that a mandrel introduces gaseous blowing medium into the parison therein so that the parison is converted into a hollow blank which may but need not closely resemble a shaped article. The mold 3 at the second blowing station 6 is open so that a freshly finished hollow shaped article can be removed or expelled from its cavity. Such article may descend by gravity or it can be separated from the respective blowing mandrel by a blast of compressed air or by a mechanical stripping device.

The interval which elapses during conversion of a parison into a blank at the first blowing station 5 is relatively short, and the mold 2 opens as soon as or shortly after the conversion of a parison into a blank is completed. The blank continues to adhere to the respective blowing mandrel so that it is suspended in an upright position while the open mold 2 advances along the path a (arrow A) toward the extruding station to receive the next parison which has been extruded through the orifice of the nozzle 1. At the same time, the open mold 3 advances along the arcuate path b (arrow B) so as to accept and confine the blank which is suspended on the blowing mandrel at the station 5. The mold 2 closes at the extruding station to confine the freshly formed parison, and the mold 3 closes at the station 2 to confine the freshly formed blank. The blank is separated from the respective blowing mandrel by a blast of compressed air or in another suitable way. The blowing mandrel at the station 5 is lifted above the closed mold 3 (or the mold is lowered below the blowing mandrel) so that the mold 3 can return to the station 6 (arrow B') while the mold 2 returns to the station 5 (arrow A'). The mold 2 can return to the station 5 simultaneously with arrival of the mold 3 at the station 6. The blank in the mold 3 is then converted into a shaped article by resorting to a blowing mandrel or needle which admits a compressed gaseous blowing medium, and the parison at the station 5 is converted into a blank by resorting to a mandrel or needle. During the just described interval, a shaped article in the closed mold 4 is allowed to cool at the blowing station 7 so that it can withstand further processing upon removal from the cavity of the mold 4. The mold 4 thereupon opens to allow for evacuation or ejection of the finished product. In the next step, the mold 4 (which is then open) moves along the path c (arrow C) to accept the blank which has been formed in the cavity of the mold 2 at the blowing station 5. The movement of the mold 4 in the direction indicated by arrow C takes place simultaneously with or shortly prior to movement of the mold 2 from the station 5 back toward the extruding station so that the mold 4 can receive the freshly formed blank and thereupon closes prior to movement back toward the station 7 (arrow C'). It will be noted that the mold 2 opens and returns to the extruding station (nozzle 1) while the mold 3 remains closed to allow for conversion of the blank therein into a shaped article and for satisfactory cooling and hardening of the shaped article. During this interval, the mold 4 is relieved of a finished shaped article and is moved to and from the station 5 to receive a fresh blank. The mold 3 opens to allow for removal of the finished shaped article therein and moves to and from the station 5 to transfer a fresh blank to the station 6 while the blank at the station 7 is being converted into a shaped article and the shaped article hardens to insure that it can withstand further processing upon removal from the cavity of the mold 4.

Figure 2:
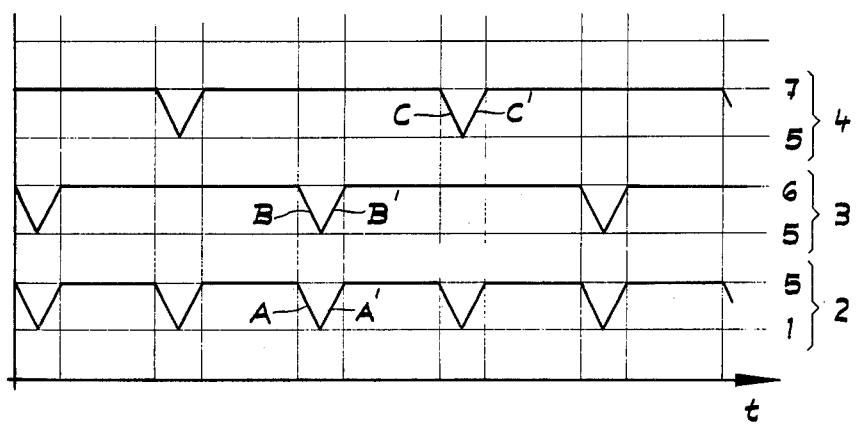
FIG. 2 is a diagram showing the relationship between the frequency of transfer of parisons from the extruding station and the frequency of transport of blanks from the first station to the respective second stations.

The lowermost curve in the diagram of FIG. 2 indicates the movements of the mold 2 between the extruding nozzle 1 and blowing station 5, and the periods of dwell of the mold 2 at the blowing station. The time t is measured along the abscissa and the movements of the mold 2 between the station 5 and the extruding station are measured along the ordinate. The median curve indicates the movements of the mold 3 between the blowing stations 5, 6 and the periods of dwell of the mold 3 at the station 6. It will be noted that the frequency of movement of the mold 2 between the extruding station and the blowing station 5 is twice the frequency of movement of the mold 3 between the blowing stations 5 and 6. The uppermost curve indicates the movements of the mold 4 between the blowing stations 5, 7 and the periods of dwell of the mold 4 at the station 7. The frequency of movement of the mold 4 is the same as that of the mold 3; however, the movements of the molds 3, 4 are staggered in such a way that each interval of dwell of the mold 3 at the blowing station 5 coincides or substantially coincides with the first, third, fifth, etc. interval of dwell of the mold 2 at the extruding station, and that each interval of dwell of the mold 4 at the blowing station 5 coincides or substantially coincides with the second, fourth, sixth, etc. interval of dwell of the mold 2 at the extruding station. The meaning of arrows A to C' in FIG. 2 is the same as in FIG. 1; thus the arrow A indicates the direction of movement of the mold 2 from the blowing station 5 to the extruding station (nozzle 1), the arrow A' indicates the direction of movement of the mold 2 from the extruding station back to the blowing station 5, and so forth. It will be seen that, in the apparatus of FIG. 1, a movement of mold 2 from the blowing station 5 to the extruding station (arrow A) takes place simultaneously with a movement of the mold 3 or 4 from the blowing station 6 or 7 to the blowing station 5 (arrow B or C), and that a movement of mold 2 from the extruding station back to the blowing station 5 (arrow A') takes place simultaneously with a movement of the mold 3 or 4 from the blowing station 5 back to the blowing station 6 or 7 (arrow B' or C'). The diagram of FIG. 2 further shows that the mold 3 dwells at the blowing station 6 while the mold 4 moves to and back from the blowing station 5, and vice versa.

The method which can be practiced with he apparatus of FIG. 1 can be modified in a number of ways without departing from the spirit of the invention. For example, the mold 2 can produce blanks which are thereupon converted into shaped articles in three or more discrete molds including the molds 3, 4 and one or more additional molds. This insures that the shaped articles can remain in the molds at the respective second blowing stations for even longer intervals of time. In each instance, and as clearly shown in FIG. 2, the interval which is allotted for the conversion of a blank into a shaped article and for the cooling of such shaped article is a multiple of the interval which is allotted for the conversion of a parison into a blank and for the cooling of such blank. Thus, if $n$ is the number of second blowing stations (such as the stations 6, 7 of FIG. 1), and $m$ is the length of intervals which are allotted for the conversion of blanks into shaped articles and for the cooling of such shaped articles, the length of intervals which are allotted for the conversion of parisons into blanks and for the cooling of blanks equals $m/n$.

If the apparatus of FIG. 1 is modified to comprise three second blowing stations, a further mold can be placed between the molds 3, 4 to be movable along a straight path indicated by the phantom line $a'$. The molds 3, 4 are then preferably moved further apart (i.e., the paths $b$ and $c$ are made longer) so as to provide room for movements of the further mold toward and away from the blowing station 5.

It is further possible to provide as many as four second blowing stations, i.e., the blowing stations 6, 7 and two additional second blowing stations which can be mirror symmetrical to the stations 6, 7 with respect to a plane $e$ which is normal to the plane of FIG. 1 and passes through the blowing station 5. This, of course, presupposes that the nozzle 1 at the extruding station can furnish parisons at a frequency which is needed to meet the requirements of molds at four discrete second blowing stations. In an apparatus with four second blowing stations, the blanks which are formed seriatim at the first blowing station 5 are transferred serially to the station 6, thereupon to the station 7, then to the station which is mirror symmetrical to the station 6 or 7, thereupon to the station which is mirror symmetrical to the station 7 or 6, again to the station 6, and so on, so that each second blowing station receives blanks at identical intervals. The sequence in which the blanks are transferred from the station 5 to the second blowing stations may be selected at will, e.g., first to the station 6, thereupon to the station which is located diametrically opposite the station 6, then to the station 7, to the station which is located diametrically opposite the station 7, to the station 6, and so on.

It is further within the purview of the invention to use the extruding nozzle 1 of FIG. 1 as a means to furnish parisons to a plurality of molds 2. For example, the apparatus of FIG. 1 may include a second mold 2 which is movable along the path $a''$ to receive alternate parisons from the nozzle 1, and two additional molds 3, 4 which receive and convert blanks produced in the second mold 2. The second mold 2 and the second molds 3, 4 are then preferably mirror symmetrical to each other with respect to a plane $d$ which is normal to the plane of FIG. 1 and passes through the extruding station (nozzle 1).

Figure 3:
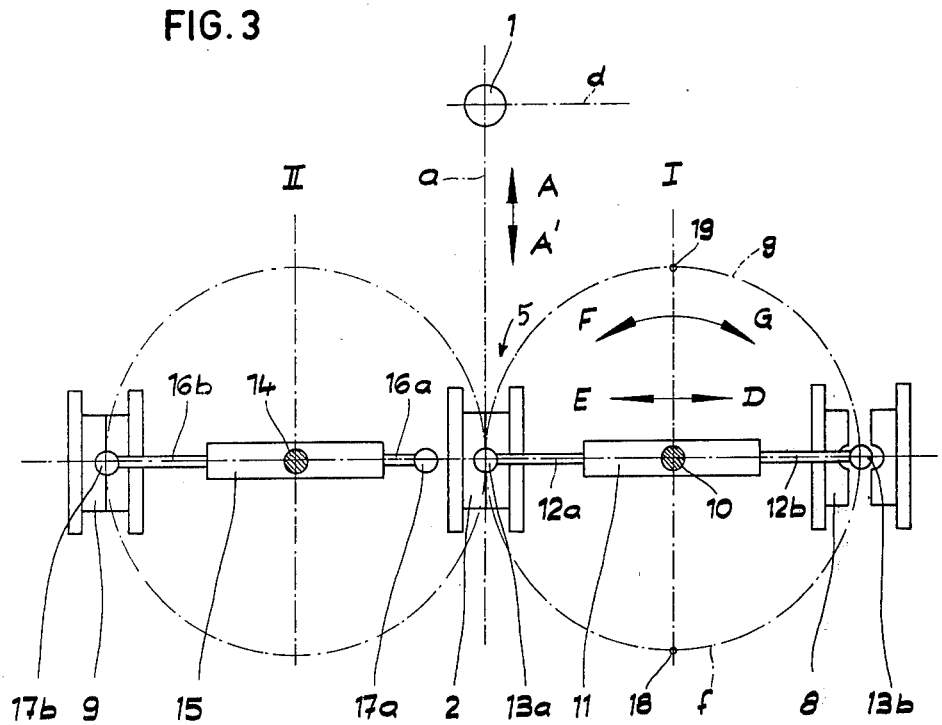
FIG. 3 is a schematic plan view of an apparatus which can be used for the practice of a second embodiment of the method.

The apparatus of FIG. 3 comprises a reciprocable mold 2 which is again movable along the path $a$ (arrows A and A') between a first blowing station 5 and an extruding station (nozzle 1), and two fixedly mounted molds 8, 9 which respectively perform the functions of the molds 4 and 3 shown in FIG. 1. The apparatus of FIG. 3 further comprises a mechanism for transporting blanks from the first blowing station 5 to the second blowing stations for the molds 8 and 9. In the apparatus of FIG. 3, the means for transporting blanks from the station 5 to the stations for the molds 8, 9 includes grippers or tongs which grasp the blanks at the station 5 and transport such blanks in upright position along arcuate paths so that the major part of each blank remains exposed. The distance between the mold 8 and the station 5 is the same as the distance between the mold 9 and the station 5. Instead of using grippers or tongs, the apparatus of FIG. 3 may employ blowing mandrels 13a, 13b, 17a, 17b which introduce a blowing medium into parisons at the first blowing station 5, thereupon support the blanks during transport from the station 5 to the stations for the molds 8, 9, and again introduce blowing medium into the blanks at the second blowing stations.

The transfer mechanism for blanks in the apparatus of FIG. 3 comprises a first section or half I including a carrier 11 which is pivotable or turnable about the axis of an upright shaft 10 and has two extensible and retractable arms 12a, 12b with blowing mandrels 13a, 13b. The directions in which the mandrels 13a, 13b are reciprocable toward and away from the shaft 10 are indicated by arrows D and E. The directions in which the carrier 11 is pivotable about the axis of the shaft 10 are indicated by arrows F and G. The left-hand section or half II of the transfer mechanism comprises an upright shaft 14, a carrier 15, two reciprocable arms 16a, 16b, and two blowing mandrels 17a, 17b.

It is assumed that the mold 2 dwells at the first blowing station 5 and confines a parison which is being converted into a hollow blank by a stream of compressed gaseous blowing medium supplied by the mandrel 13a on the arm 12a of the carrier 11. The mold 8 is open so that a freshly finished hollow shaped article can be separated from the mandrel 13b. The mold 9 is closed and surrounds a portion of the mandrel 17b which has supplied blowing medium for conversion of a blank into a shaped article. Such article is being cooled to harden in order to withstand the treatment subsequent to removal from the cavity of the mold 9.

The mandrel 17a is adjacent to the blowing station 5 and is ready to enter the mold 2 as soon as the latter brings a parison from the extruding station (nozzle 1) in order to convert the parison into a hollow blank. It will be noted that the arm 16a for the mandrel 17a is partially retracted into the carrier 15 so that the mandrel 17a cannot interfere with movements of the mold 2 along the path $a$. When the mold 2 is ready to open, it releases the freshly formed blank which remains suspended on the mandrel 13a, and the mold 2 thereupon advances toward the extruding station (arrow A) to receive a fresh parison. The carrier 11 is caused to pivot anticlockwise, as viewed in FIG. 3, so that the mandrel 13a transports the freshly formed blank from the station 5 along an arcuate path $f$ and introduces the blank into the space between the sections of the open mold 8. At the same time, the mandrel 13b travels along the arcuate path $g$ and its arm 12b is partially retracted into the carrier 11 so that the mandrel 13b comes to a halt adjacent to the station 5 in a position corresponding to that of the mandrel 17a. If desired, the carrier 11 can be pivoted in the direction indicated by arrow G provided that its movements are timed with a view to avoid interference with movements of the mold 2 along the path $a$. In the embodiment of FIG. 3, the carrier 11 or 15 is always pivoted through 180° because the stations for the fixedly mounted molds 8, 9 are located diametrically opposite the station 5.

In the meantime, the mold 2 has received a fresh parison from the nozzle 1 and has returned to the station 5 (arrow A') where the parison is converted into a blank by blowing medium which is supplied by the mandrel 17a. This mandrel moves into register with the mold 2 at the first blowing station 5 in response to extension of the arm 16a so that it assumes a position corresponding to that of the mandrel 13a shown in FIG. 3. The movement of the mandrel 17a is assumed to be a composite movement including a movement into register with the parison at the station 5 and a movement axially of the parison so that the tip of the mandrel 17a penetrates into the upper end of the parison.

The mold 9 thereupon opens and allows for evacuation of the shaped article from its cavity. Such evacuation takes place in response to admission of a blast of compressed gas into the interior of the hardened shaped article or by resorting to a suitable mechanical separating device which strips the shaped article off the mandrel 17b. When the mold 2 thereupon opens, the carrier 15 is pivoted about the axis of the shaft 14 so that the mandrel 17a transfers a freshly formed blank from the first blowing station 5 into the space between the spaced-apart sections of the open mold 9. The mold 9 thereupon closes and the mandrel 17a admits compressed gaseous blowing medium which converts the blank in the cavity of the mold 9 into a shaped article. The article is allowed to cool and harden before the mold 9 opens again. The mandrel 17b is held adjacent to the station 5 and its arm 16b is partially retracted into the carrier 15, the same as the arm 16a of FIG. 3.

Figure 4:
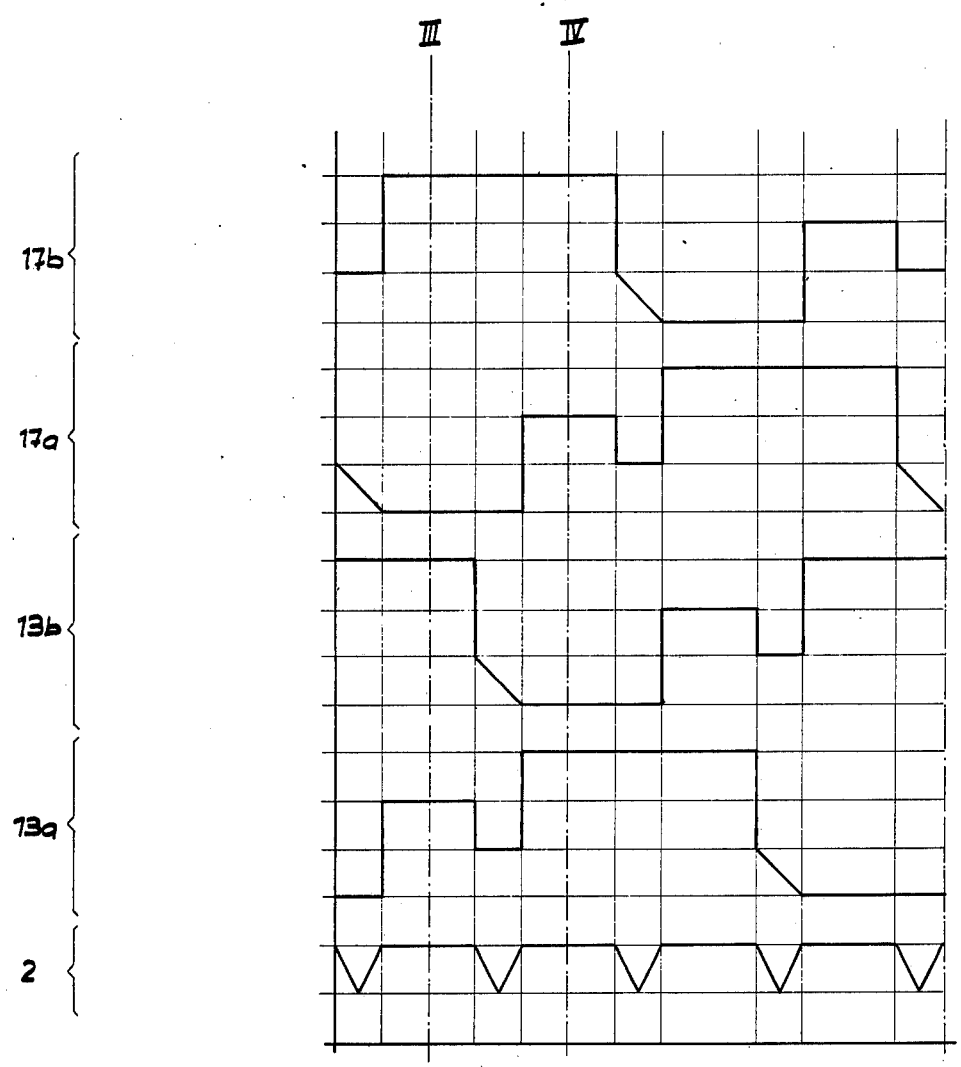
FIG. 4 is a diagram showing the relationship between the frequency of transfer of parisons from the extruding station of the apparatus of FIG. 3 and the frequency of transfer of blanks from the first station to the respective second stations.

The lowermost curve of the diagram shown in FIG. 4 represents the movements of the mold 2 between the first blowing station 5 and the extruding station (nozzle 1). The next-to-the lowermost curve represents the movements of the mandrel 13a, the median curve the movements of the mandrel 13b, the topmost curve the movements of the mandrel 17b, and the second curve from the top the movements of the mandrel 17a. The vertical line III indicates the positions which the mold 2 and the mandrels 13a, 13b, 17a, 17b assume in FIG. 3. The mold 2 is closed and is located at the first blowing station 5, the mandrel 13a supports and expands the parison in the closed mold 2 at the station 5, the mandrel 13b is located at the second blowing station for the fixedly mounted mandrel 8, the mandrel 17a is adjacent to but spaced from the station 5, and the mandrel 17b is located at the second blowing station for the mold 9 and extends into the upper end of the shaped article in the cavity of the mold 9.

The vertical line IV of FIG. 4 represents the positions of the mold 2 and mandrels 13a, 13b, 17a, 17b when the mold 2 completes the next movement to the extruding station (nozzle 1) and back to the first blowing station 5. The mold 2 is closed at the station 5 and the parison therein is being expanded by gas issuing from the mandrel 17a. The mandrel 13a occupies a position corresponding to that of the mandrel 13b in FIG. 3, and the mandrel 17b occupies a position corresponding to that of the mandrel 17a in FIG. 3. Thus, the mold 8 is closed and the mandrell 13a admits a gaseous blowing medium which expands the blank in the cavity of the mold 8 to form a shaped article therein. The mandrel 17b is located at the station 5 and admits a blowing medium into the parison in the closed mold 2. The arm 12b for the mandrel 13b is retracted the same as the arm 16a of FIG. 3, and the arms 16a, 16b are extended, the same as the arms 12a, 12b of FIG. 3. The mold 9 is open and its sections flank the mandrel 17a.

The apparatus of FIG. 3 is also susceptible of many modifications. For example, the mold 2 can produce blanks for further processing in three or more fixedly mounted open-and-shut molds. Also, the nozzle 1 can furnish parisons for transport by two or more discrete molds a; the apparatus may comprise a second mold 2 which reaches the extruding station when the mold 2 of FIG. 3 is located at the first blowing station 5, and the second mold 2 can produce or form blanks which are being processed by two additional fixedly mounted molds. Such apparatus comprises the molds 2, 8, 9 of FIG. 3 and three additional molds which are mirror symmetrical to the molds 2, 8, 9 with respect to a plane d normal to the plane of FIG. 3 and passing through the extruding station (nozzle 1). Moreover the carriers 11, 15 can be mounted for pivotal movement in clockwise and counterclockwise directions, especially if the arms 12a, 12b and 16a, 16b carry tongs or analogous gripping devices and the apparatus comprises blowing mandrels which are movable up and down but need not move sideways from the respective blowing stations.

Still further, the mandrels 13a, 13b, 17a, 17b (or the aforementioned grippers or tongs) can serve to transport shaped articles from the respective fixed molds to further processing stations which are disposed between the station 5 and the stations for the molds 8, 9. For example, and referring again to FIG. 3, the mold 8 can be mounted at a second blowing station 18, an imprinting station can be located at the station occupied by the mold 8 of FIG. 3 (at this station, the shaped articles which have been removed from the mold 8 at the station 18 can be provided with printed matter or with one or more labels carrying printed matter or other information), and the imprinted shaped articles can be filled with a fluid, flowable solid material or discrete commodities at a further station 19 shown in the right-hand part of FIG. 3. Also, the filled shaped articles can be separated from their mandrels or tongs at the station 19 or between the stations 19 and 5. The same applies for the left-hand portion of the structure shown in FIG. 3.

An important advantage of the improved method is that it allows for highly satisfactory hardening of shaped articles prior to their expulsion from the respective molds, and that the blanks need not be left in the respective mold or molds 2 as long as the molds for the making of shaped articles remain closed. The method can embrace biaxial stretching as disclosed in the aforementioned U.S. Pat. No. 2,919,462 according to which the dimensions and shape of the blank deviate considerably from the dimensions and shape of the final products, as well as the making of blanks whose dimensions deviate only negligibly from the dimensions of the final products, i.e., according to which the treatment in the mold at a second blowing station merely involves expansion of the blank by a fraction of a millimeter and/or minute rounding, profiling or similar treatment of blanks.

The improved method allows for conversion of parisons into blanks at a rate which is achievable in a high-speed blow molding apparatus but the conversion of blanks into final shaped articles need not take place at the same rate so that the blanks need not be subjected to excessive cooling and hardening prior to further treatment to convert them into shaped articles. This is achieved by using several second blowing stations for each first blowing station so that the time for the making of blanks can take up only a small fraction of the time which is needed for the making and satisfactory cooling and hardening of shaped articles. The number of molds which convert blanks into shaped articles depends on the nature of thermoplastic material, on the dimensions and wall thickness of the shaped articles, on the nature of cooling means for the molds at the first and second blowing stations, and also on the nature of treatment to which the shaped articles are to be subjected after they leave the respective second blowing stations. The method can be resorted to for increasing the output of a blow molding apparatus, for improving the quality of shaped articles, or for increasing the output to the maximum extent possible without unduly affecting the quality of shaped articles. As a rule, the mold for conversion of parisons into blanks is lighter and hence more readily movable at a high speed than the molds which are used for conversion of blanks into shaped articles, and the mold for the conversion of parisons into blanks can be closed and held in locked position by a force which is much smaller than the force needed to close and lock a mold for the conversion of blanks into shaped articles. The improved method takes advantage of this by including the step of converting parisons into blanks at a rate which is a multiple of the rate of conversion of blanks into shaped articles at any one of the second blowing stations.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A method of converting plasticized parisons consisting of synthetic thermoplastic material into hollow shaped articles in respective open-and-shut final molds which are each located at respective final blowing stations and which each cooperate with at least two blowing mandrels, comprising the steps of inserting blowing mandrels of the respective final blowing stations into successive parisons and pneumatically expanding the latter into hollow preforms at a pre-blowing station which is located centrally of said final blowing stations; transferring successively produced preforms alternately to the respective final blowing stations by moving the respective blowing mandrels together with the preforms along circular paths each of which passes through the respective final mold when the same is in open condition, and concomitantly moving the other blowing mandrel of the same final blowing station from the final mold thereof to the vicinity of said pre-blowing station; closing the respective final mold about a preform located at the respective final blowing station; and converting the preforms at said final blowing stations into hollow shaped articles, the length of the intervals for conversion of parisons into preforms being equal to or approximating $m/n$ wherein $n$ is the number of final blowing stations and $m$ is the length of the time interval for conversion of a preform into a shaped article.

2. A method as defined in claim 1, wherein at least the major part of each preform remains exposed during movement of the preform and the associated mandrel to the respective final blowing station.

3. A method as defined in claim 1, wherein said preforms are subjected to biaxial stretching.

4. A method as defined in claim 1, wherein the step of pneumatically expanding comprises introducing a blowing medium via the inserted mandrel into the respectively associated parison; and the step of converting comprises again introducing a blowing medium via the same mandrel into the associated preform.

5. A method as defined in claim 1, wherein the step of moving comprises presenting the respective preform to at least one processing station located intermediate said pre-blowing and blowing stations, for additional treatment prior to the step of converting.

* * * * *